F. P. STONE.
WHEEL.
APPLICATION FILED OCT. 2, 1913.
1,210,229.
Patented Dec. 26, 1916.
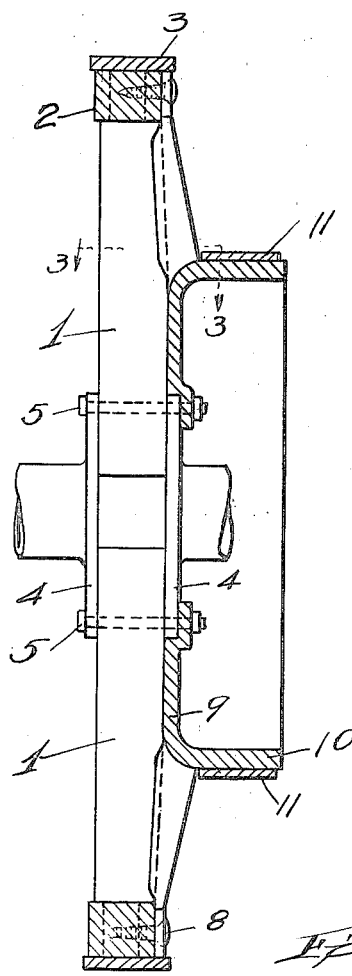
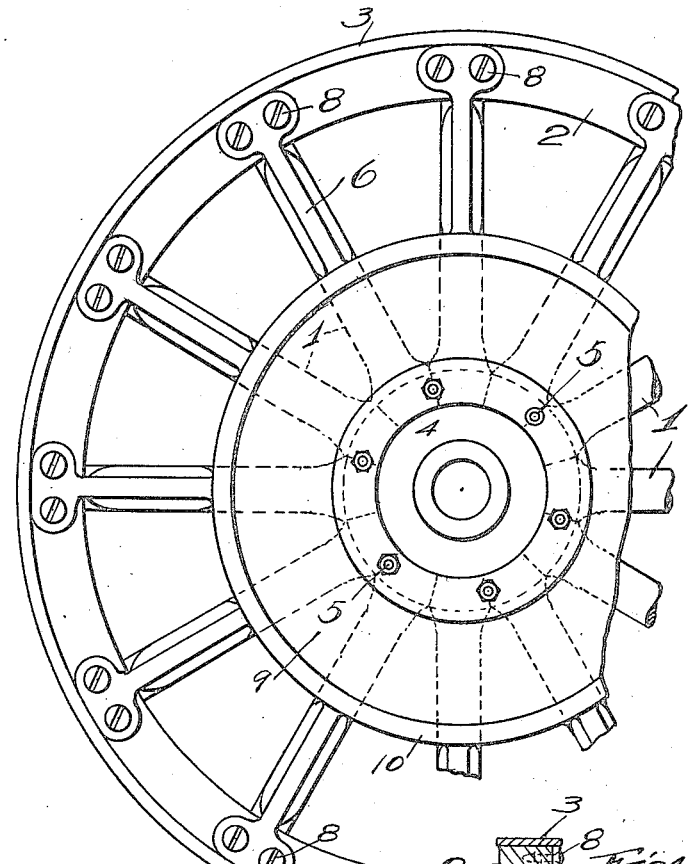
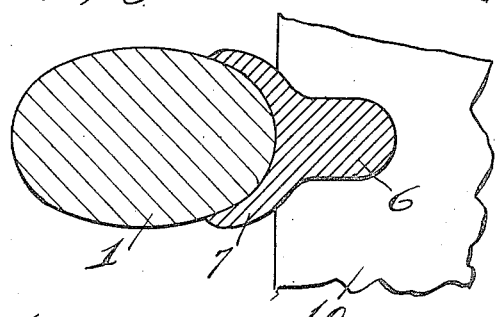
Witnesses:
Inventor
Frank P. Stone.
Parker & Carter
by
his Attys.

UNITED STATES PATENT OFFICE.

FRANK P. STONE, OF CHICAGO, ILLINOIS.

WHEEL.

1,210,229.

Specification of Letters Patent.

Patented Dec. 26, 1916.

Application filed October 2, 1913. Serial No. 792,930.

*To all whom it may concern:*

Be it known that I, FRANK P. STONE, a citizen of the United States, residing at Chicago, in the county of Cook and State of Illinois, have invented a certain new and useful Improvement in Wheels, of which the following is a specification.

This invention relates to improvements in wheels and has for its object to provide a new and improved device of this description.

Wheels for vehicles which have a plurality of wheels in pairs at opposite ends of one or more axles, are usually made of wood and are subject to great lateral strain. When such wheels break, they almost invariably break at the under side inwardly on account of this lateral pressure, due to the swaying of the vehicle and the swinging of the wheel in turning, particularly out of ruts or against obstacles and due to the striking of obstacles. Before the advent of automobiles this tendency of the wheel to break inwardly at the bottom, due to this great lateral strain, was guarded against by dishing the wheel outwardly. Upon the advent of the automobile, where the driving power is applied to the wheels through shafts, it was found impractical to dish these wheels and hence such wheels are made with straight spokes, the danger of breaking being decreased by reducing the diameter of the wheel, so as to decrease the leverage and also by the application of the pneumatic tire. It follows however that since the weight of the automobile, and the speed at which it is driven are much greater than in the case of the ordinary carriage or wagon, the strain on the automobile wheels is much greater than those to which the carriage or wagon wheels were subjected. This straight spoke of the automobile wheel is therefore an element of weakness in the structure, and since broken wheels are liable to cause serious accidents, the importance of strengthening these wheels will be readily seen.

The present invention has as one of its objects to strengthen these straight spoke wheels.

The invention is illustrated in the accompanying drawings, wherein—

Figure 1 is a sectional view through a wheel, showing the application of the invention to one form of automobile driving wheel; Fig. 2 is a view with parts broken away, showing the inner face of the wheel, illustrated in Fig. 1. Fig. 3 is a sectional view taken on line 3—3 of Fig. 1. Fig. 4 is a sectional view showing the invention as applied to an ordinary wheel.

Like numerals refer to like parts throughout the several figures.

As illustrated in the accompanying drawings, I have shown an automobile wheel with the usual straight spokes 1, connected with the felly 2, and provided with an outer metal rim or tire 3. The spokes are connected together at the center by the hub plates 4 and bolts 5, passing therethrough. It is usual to connect the brake drum of the automobile to the rear wheel thereof. In Figs. 1 and 2 I have illustrated a form of strengthening device for the wheel particularly adapted for use in connection with these brake drums. In this construction the strengthening device consists of a series of strengthening pieces 6 placed on the inside of the spokes 1, and engaging said spokes. These strengthening pieces may be of any desired shape or form.

In Figs. 1, 2 and 3 I have illustrated a convenient form where the strengthening pieces are provided with curved recessed portions 7, into which the spokes fit. The ends of the strengthening pieces 6, project along the felly and are fastened thereto by any suitable factening device, such as screws 8. The ends of the strengthening devices are preferably enlarged and engage the metal rim or tire 3. The strengthening pieces 6, are connected with a central hub portion 9, which is fastened to the wheel in any desired manner. In Figs. 1 and 2 it is shown as fastened to the hub plates 4. This hub portion 9 may be of any desired form or construction. As shown in Figs. 1 and 2 it has connected therewith a brake drum, 10, which is engaged by any usual form of brake band 11, the strengthening pieces 6, are preferably dished to some extent, so that when sufficient pressure is applied to the wheel to bend the spokes this dishing will cause the strengthening pieces to be elongated as it were, and press against the metal rim or tire 3, thus increasing the resisting power of the strengthening device. I have shown the strengthening device with the strengthening pieces connected to a central hub, forming as it were a spider, but it is of course evident that any other suitable arrangement for the strengthening device may be used.

In Fig. 4 I have shown one form of the invention in connection with the front wheel of an automobile. In this construction the strengthening pieces 6, are connected directly to one of the hub plates 4, either by being integral therewith, or in any other desired manner.

While this invention is particularly adapted for strengthening straight spoke wheels, it is of course evident that it may be used in connection with any other form of wheel and I therefore do not limit myself to the particular use or construction herein illustrated.

The use and operation of my invention are as follows: When the strengthening device is in position and pressure is applied to the spokes of the wheel, it will be seen that this pressure is resisted not only by the spokes but by the strengthening device. When for example, the outside edge of the bottom of the wheel strikes the side of a rut, as in turning out, a great pressure is applied at the bottom to force the bottom inwardly. The axle of the vehicle acts at the center like a battering ram, pushing the center of the wheel outwardly as the vehicle is turned. When the strengthening device is not used, it will be seen that this pressure tending to break the wheel, is distributed only over a few of the spokes at the bottom of the wheel, while when applicant's strengthening device is used it is distributed over all of the spokes, thus increasing the strengthening of the wheel itself by bringing a larger number of spokes and a greater portion of the wheel into use in resisting the strain applied at a particular point. It will further be seen that this strain at a particular part of the wheel is also resisted by the strengthening device itself and is distributed over all of the strengthening pieces in the particular construction illustrated, thus giving the wheel a very great additional resisting power. This resisting power is again increased by the fact that the strengthening pieces 6, are dished and if the pressure becomes great enough to bend the spokes slightly, the ends of the strengthening pieces are forced outwardly with a great pressure against the metal rim or tire 3, thus bringing its resisting power into use to resist the lateral strain on the wheel. In other words, it will be seen that these dished strengthening pieces, have resisting parts at both ends which resist the straightening out of the dish when force is applied to the hub of the wheel tending to force it outwardly, thereby greatly adding to the resisting power of the wheel as a whole. It will thus be seen that by means of this strengthening device automobile wheels may be very greatly strengthened at little expense. It is of course evident that the strengthening device may be of such size and shape as to give any desired amount of resisting power to the wheel.

The preferred construction is such that the wheel will be made so strong that the axle will bend before the wheel breaks, thus eliminating the danger of accidents because when a strain is put upon the wheel sufficient to bend the axle this will be noted and the injury remedied before the danger situation is reached. It will be noted that in this construction there are two series of connections between the hub and the felly, one series consisting of the spokes which engage the inner face of the felly, the other series consisting of the parts 6 which are fastened to the felly at one side of the point where the spokes are connected therewith. This construction gives a much stronger support for the felly, and in addition to the other advantages, helps to support the felly at the edge so that it cannot be bent in, distorted or broken, and this is particularly true with wide fellies.

I claim:

1. A wheel comprising a series of spokes, a felly with which said spokes are connected, a spider comprising a central part fastened to the wheel, a series of strengthening parts projecting from the central part along the spokes, said strengthening parts extending to a point opposite the felly of the wheel.

2. A wheel comprising a series of spokes, a felly to which said spokes are connected, an outer metal tire, a strengthening spider connected with one face of said wheel, said spider comprising a central part connected to the wheel hub and a series of strengthening parts projecting along the spokes of the wheel, said strengthening parts being dished.

3. A wheel comprising a series of spokes, a felly to which said spokes are connected, an outer metal tire, a strengthening spider connected with one face of said wheel, said spider comprising a central part and a series of strengthening parts projecting along the spokes of the wheel, said strengthening parts being dished, the ends of the strengthening parts engaging said tire so as to be forced thereagainst when pressure is applied to the wheel.

4. A wheel comprising a series of spokes, hub flanges connecting the spokes together at the center, a felly connecting the spokes together at their outer ends and strengthening device connected with one face of the wheel and comprising a central part connected with one of the hub flanges and a series of projecting strengthening parts extending along the spokes.

5. A wheel comprising a series of spokes, hub flanges connecting the spokes together at the center, a felly connecting the spokes together at their outer ends and strengthening device connected with one face of the wheel and comprising a central part connected with one of the hub flanges and a series of projecting strengthening parts extending along the spokes, said projecting strengthening parts fastened to said felly.

6. A wheel comprising a series of spokes, hub flanges connecting the spokes together at the center, a felly connecting the spokes together at their outer ends and strengthening device connected with one face of the wheel and comprising a central part connected with one of the hub flanges and a series of projecting strengthening parts extending along the spokes and a brake drum connected with said central part.

7. A wheel comprising a series of spokes, hub flanges connecting the spokes together at the center, a felly connecting said spokes together at their outer ends, reinforcing pieces at one side of said spokes, said reinforcing pieces connected with said felly and one of said hub flanges.

8. A strengthening device for wheels comprising a strengthening spider having a central hub portion and a series of projecting strengthening portions adapted to project along the spokes of the wheel, the ends of the projecting portions adapted to be connected with the felly of the wheel and the central hub portion adapted to be connected with the wheel and a brake drum integral with said central hub portion.

9. A wheel comprising a hub, a felly, a series of rigid spokes acting under compression connecting the hub and felly, dished reinforcing compression pieces for said spokes projecting beyond the points at which the spokes engage the felly, and resisting parts at both ends of said reinforcing pieces, which resist the straightening out of the dish when force is applied to said hub tending to force it outward, the resisting part at the outer end of said reinforcing pieces being beyond the point where the reinforcing pieces engage the felly.

10. A wheel comprising a hub, a felly, two series of connections between said hub and felly, one series engaging the felly on its inner face and the other series engaging the felly on its side face, an outer metal tire surrounding the felly, the outer end of said latter series of connections engaging said tire so as to press against it and resist distortion of the wheel.

11. A wheel comprising a hub, a felly, a series of compression spokes, connecting said hub and felly, and a series of compression connecting pieces connected with the hub at one end, the other ends of said connecting pieces being fastened to the felly at one side of the point where the spokes are connected therewith, said connecting pieces in alinement with said spokes.

In testimony whereof, I affix my signature in the presence of two witnesses.

FRANK P. STONE.

Witnesses:
 MINNIE M. LINDENAU,
 B. MAWHINEY.